United States Patent
Coates et al.

[11] Patent Number: 5,604,612
[45] Date of Patent: Feb. 18, 1997

[54] PAPER WHITE PDLC SYSTEM

[75] Inventors: David Coates, Merley Wimborne; Patrick Nolan, Poole, both of Great Britain; Ewald Ginter, Stuttgart, Germany

[73] Assignee: Merck Patent Gesellscaft mit beschrankter Haftung, Darmstadt, Germany

[21] Appl. No.: 387,850
[22] PCT Filed: Aug. 12, 1993
[86] PCT No.: PCT/EP93/02145
§ 371 Date: Feb. 24, 1995
§ 102(e) Date: Feb. 24, 1995
[87] PCT Pub. No.: WO94/04958
PCT Pub. Date: Mar. 3, 1994

[30] Foreign Application Priority Data

Aug. 25, 1992 [EP] European Pat. Off. .............. 92114456

[51] Int. Cl.⁶ ............................................ G02F 1/1333
[52] U.S. Cl. .......................................................... 349/86
[58] Field of Search ........................................ 359/51, 52

[56] References Cited

U.S. PATENT DOCUMENTS 4,944,576  7/1990  Lacker et al. ................... 359/51
5,206,747  4/1993  Wiley et al. ..................... 359/51

FOREIGN PATENT DOCUMENTS

89/06264  7/1989  WIPO ............................. 359/52

*Primary Examiner*—William L. Sikes
*Assistant Examiner*—Walter J. Malinowski
*Attorney, Agent, or Firm*—Millen, White, Zelano, & Branigan, P.C.

[57] ABSTRACT

The invention relates to a paper white PDLC system which between 2 electrode layers contains a PDLC film comprising a liquid crystal mixture forming microdroplets in an optically isotropic, transparent polymer matrix, in which one of the refractive indices of the liquid crystal mixture is matched to the refractive index of the polymer matrix $n_M$, the transmission of which can be varied by applying an electrical voltage characterized in that the PDLC film exhibits the following properties:

$$|\bar{n}-n_M| \geq 0.05$$

wherein $\bar{n}$ is the mean refractive index of the liquid crystal mixture defined via $$\bar{n}^2 = \tfrac{1}{3}(m_e^2 + 2n_o^2)$$

mean droplet diameter $\leq 2$ μm
thickness of PDLC film $5\ \mu m \leq d \leq 75\ \mu m$
degree of backscatter $\geq 20\%$

17 Claims, 6 Drawing Sheets

PAPER WHITE PDLC SYSTEM

The invention relates to an electrooptical liquid crystal system which between 2 electrode layers contains a PDLC fill comprising a liquid crystal mixture being dispersed in the form of microdroplets in an optically isotropic, transparent polymer matrix, in which one of the refractive indices of the liquid crystal liquid mixture is matched to the refractive index of the polymer matrix, and the transmission of which can be varied by applying an electrical voltage.

The invention further relates to a PDLC fill with enhanced backscattering.

The preparation of PDLC (=polymer dispersed liquid crystal) fills is described, for example, in U.S. Pat. No. 4,688,900, Mol. Cryst. Liq. Cryst. Nonlin. Optic, 157, 1988, 427–441, WO 89/06264 and EP 0,272,585. In the so-called PIPS technology (=polymerization-induced phase separation) the liquid crystal mixture is first homogeneously mixed with monomers and/or oligomers of the matrix-forming material; phase-separation is then induced by polymerization, and one can differentiate between radical PIPS, in particular photoradical PIPS, and non-radical (for example, thermally induced) PIPS. Differentiation must further be made between TIPS (temperature-induced phase separation) and SIPS (solvent-induced phase separation) (Mol. Cryst. Liq. Cryst. Inc. Nonlin. Opt. 157 (1988)427) both being also methods to produce PDLC fills.

The process of preparation must be controlled very carefully in order to obtain systems with good electrooptical properties. F. G. Yamagishi et al., SPIE Vol. 1080, Liquid Crystal Chemistry, Physics and Applications, 1989, p. 24 differentiate between a "Swiss cheese" and a "polymer ball" morphology. In the latter one, the polymer matrix consists of small polymer particles or "balls" being connected or merging into each other while in the Swiss cheese system, the polymer matrix is continuous and exhibits well defined, more or less spherical voids containing the liquid crystal. The Swiss cheese morphology is preferred because it exhibits a reversible electrooptical characteristic line while the polymer ball system shows a distinct hysteresis generally leading to a drastic deterioration of the electrooptical characteristic line when comparing the virgin and the second run.

According to Yamagishi et al., loc. cit., the Swiss cheese morphology is promoted in case the polymerization reaction rims via a step mechanism, and in WO 89/06264 it is pointed out that the step mechanism is favoured in case the precursor of the polymer matrix consists of multifunctional acrylates and multifunctional mercaptanes.

Another important point which can be influenced by a careful selection of process parameters such as curing temperature, relative concentration and choice of the components of the prepolymer etc., is the mean size of the microdroplets. Generally, relatively small microdroplets cause relatively high threshold voltage $V_{th}$, but relative short switching times $t_{on}$ and $t_{off}$ as is discussed, for example, in U.S. Pat. No. 4,673,255. Experimental methods for influencing the average droplet size are described, for example, in U.S. Pat. No. 4,673,255 and in J. L. West, Mol. Cryst. Liq. Cryst. Inc. Nonlin. Opt., 157, 1988, 427. In U.S. Pat. No. 4,673,255, average drop diameters between 0.1 μm and 8 μm are given, while, for example, a matrix which is based on a glass monolith has pores having a diameter between 15 and 2,000 Å. For the mesh width of the network of PN systems, a preferred range between 0.5 and 2 μm is given in EP 0,313,053.

In PDLC films, one of the refractive indices of the liquid crystal mixture, customarily the ordinary refractive index $n_o$, is selected in such a way that it more or less coincides with the refractive index $n_M$ of the cured polymeric matrix. It must be differentiated between the refractive index $n_p$ of the cured pure polymer (no liquid crystal incorporated) and the refractive index $n_M$ of the cured polymer matrix containing liquid crystal microdroplets; $n_M$ generally deviates from $n_p$ due to liquid crystal dissolved in the matrix (see P. Nolan, M. Tillin and D. Coates, Liquid Crystal Microdroplet Composition in a UV Cured Film, Mol. Cryst. Liq. Cryst. Letters, Vol. 8 (6), pp. 129–13 ). If no voltage is applied to the electrodes, the liquid crystal molecules in the droplets exhibit a distorted alignment, and incident light is scattered at the phase boundary between the polymeric and liquid crystal phases.

On applying a voltage, the liquid crystal molecules are aligned parallel to the field and perpendicular to the E vector of the transmitted light. Normally incident light (viewing angle $\Theta=0°$) now sees an optically isotropic medium and appears transparent.

No polarizers are required for operating PDLC systems, as a result of which these systems have high transmission. PDLC systems provided with active matrix addressing have been proposed on the basis of these favorable transmission properties in particular for projection applications, but in addition also for displays having high information content and for further applications.

The liquid crystal mixtures used for producing PDLC systems have to meet a wide range of demands. One of the refractive indices of the liquid crystal mixture is selected such that it matches with the refractive index of the polymer matrix. The term matching of refractive indices used here covers not only the case $n_o$ (resp. another refractive index of the liquid crystal mixture)~$n_M$, but also the condition $n_o$ (resp. another refractive index of the liquid crystal mixture)<$n_M$ which is sometimes chosen to reduce off-axis haze and enlarge the view angle as described, for example, in EP 0,409,442.

The liquid crystal mixture preferably has a positive dielectric anisotropy but the use of dielectrically negative liquid crystal mixtures (see, for example, WO 91/01511) or two-frequency liquid crystal mixtures (see, for example, N. A. Vaz et at., J. Appl. Phys. 65, 1989, 5043) is also discussed.

Furthermore, the liquid crystal mixture should have a high clearing point, a broad nematic range, no smectic phases down to low temperatures and a high stability and should be distinguished by an optical anisotropy Δn and a flow viscosity η which can be optimized with respect to the particular application, and by a high electrical anisotropy.

A series of matrix materials and polymerization processes have hitherto been proposed for producing PDLC systems. The PIPS, SIPS and TIPS technologies are described in some detail in Mol. Cryst. Liq. Cryst. Inc. Nonlin. Optics, 157, 1988, 427. The PDLC systems described in Mol. Cryst. Liq. Cryst. Inc. Nonlin. Optics, 157, 1988, 427 are based on an epoxy film, while in EP 0,272,585 acrylate systems are given. The PDLC system of WO 89/06264 is based on multifunctional acrylates and multifunctional thioles, and Y. Hirai et al., SPIE Vol. 1257, Liquid Crystal Displays and Applications, 1990, p. 2 describe PDLC systems the precursor of the polymer matrix of which being based on monomers and oligomers. Further suitable matrix materials are described, for example, in U.S. Pat. No. 3,935,337, WO 91/13126 and in further references.

Electrooptical systems containing PDLC films can be addressed passively or actively. Active driving schemes employing an active matrix having nonlinear addressing elements integrated with the image point, are especially useful for displays with high information content. More details on the addressing of liquid crystal displays by an active matrix of nonlinear elements can be found, for example, in A. H. Firester, SID, 1987, Society for information Display Seminar 5: Active Matrices for Liquid Crystals, E. Kaneko, Liquid Crystal Displays, KTK Scientific Publishers, Tokyo, Japan, 1987, chapter 6 and 7 or P. M. Knoll, Heidelberg, 1986, p. 216 ff.

When the PDLC system is addressed by means of an active matrix, a further far reaching criterion is added to the requirements listed so far which must be fulfilled by the cured polymer and the liquid crystal mixture being embedded in microdroplets. This is related to the fact that each image point represents a capacitive load with respect to the particular active nonlinear element, which is charged at the rhythm of the addressing cycle. In this cycle, it is of paramount importance that the voltage applied to an addressed image point drops only slightly until the image point is again charged in the next addressing cycle. A quantitative measure of the drop in voltage applied to an image point is the so-called holding ratio (HR) which is defined as the ratio of the drop in voltage across an image point in the non-addressed state and the voltage applied; a process for determining the HR is given, for example, in Rieger, B. et al., Conference Proceeding der Freiburger Arbeitstagung Flütssigkdstalle (Freiburg Symposium on Liquid Crystals), Freiburg 1989. Electrooptical systems having a low or relatively low HR show insufficient contrast.

There have been several attempts to improve the optical appearance of PDLC films. JP 03-186,815, for example, describes PDLC films with a colored appearance which can be obtained by adding a dichroic dye. JP 03-185,816 proposes a PDLC system comprising a color filter on the viewer's side of the display and an absorber on the rear side thus producing black characters on a colored background.

In U.S. Pat. No. 5,052,784 Fergason describes colored NCAP systems which contain non-pleochroic and, in particular, fluorescent dyes. The dye molecules color, brighten and/or whiten the scattered light. The NCAP film might be mounted into a transparent support medium, and a black or colored absorber is placed at the rear side of the system. The dye component preferably is in the NCAP film. The light intensity of the scattered light can be enhanced by total internal reflection which is effected by placing a suitable reflectance material which might be a solid, a fluid or a gaseous medium such as air between the absorber and the support medium. In a preferred embodiment, the NCAP film exhibits bright color characters on a relatively dark background in the off-state which is achieved by using a discontinuous NCAP film being segmented into several proportions which represent the various characters to be displayed.

The incorporation of the dye component into PDLC systems which are prepared via the PIPS technology, however, is generally not possible, in particular not if the polymerization proceeds radically. It was found that a dye component in most cases inhibits or even prevents curing of the matrix; furthermore the dye molecules which in most cases exhibit a π-electron system, do quite generally not survive a free radical cure. But also in the case of TIPS the incorporation of a dye component is often not possible due to an insufficient thermal stability of many dye systems.

For computer screens and other types of devices which are mainly used for displaying verbal and/or graphical information but also for other applications, displays are required showing dark, in particular black or colored characters on a white or whitish background and exhibiting at the same time a good or even high contrast.

Electrooptical systems of this type which might be termed as paper white PDLC systems cannot be realized with the PDLC films proposed so far or can be realized only to an insufficient degree. It is true that conventional PDLC films in some cases exhibit a white or whitish appearance but the hiding power of conventional PDLC films is far too low to cover a colored or black backplate. The backplate shines through and thus deteriorates the white or whitish color of the PDLC film; furthermore, the contrast of such systems often is not sufficient. The incorporation of a dye component is often impossible due to principle reasons as was outlined above, and furthermore leads to a colored background which is not desired.

The object of the present invention was to provide PDLC films exhibiting a white or whitish appearance and a high hiding power which are suited to be incorporated into paper white PDLC systems. Another object of the invention are precursors of such PDLC films containing monomers, oligomers and/or prepolymers, a liquid crystal mixture and, optionally, a polymerization initiator. Other aims of the present invention are immediately evident to the person skilled in the art from the following detailed description.

It has been found that paper white PDLC systems are realized by electrooptical systems:
which between 2 electrode layers contain a PDLC film comprising a liquid crystal mixture forming microdroplets in an optically isotropic, transparent polymer matrix, in which one of the refractive indices of the liquid crystal mixture is matched to the refractive index of the polymer matrix $n_M$, the transmission of which can be varied by applying an electrical voltage, characterized in that the PDLC film exhibits the following properties:

$$|\bar{n} - n_M| \geq 0.05$$

wherein $\bar{n}$ is the mean refractive index of the liquid crystal mixture defined via $$\bar{n}^2 = \frac{1}{3}(n_e^2 + 2n_o^2)$$

mean droplet diameter $\leq 2$ μm
thickness of PDLC film $5$ μm $\leq d \leq 75$ μm
degree of backscatter $\geq 20\%$ The system preferably contains a black or colored backplane which is optically decoupled from the PDLC film by a small gap or, alternatively, by using a low refractive index adhesive to attach the backplane to the PDLC device.

The invention relates to such paper white PDLC systems, to methods of their preparation and to their use in direct view type electrooptical devices displaying at least partly verbal and/or graphical information such as computers, notepads etc.

The term paper white PDLC system applies to electrooptical systems exhibiting a high degree of backscattering and a good hiding power of the PDLC film in the off-state.

The backscatter from newspaper and writing varies from about 0.45 to 0.75 but it was found out by the present inventors that systems with an acceptable degree of whiteness are obtained if the ratio of the intensity of the backscattering light to the intensity of the illuminating light is not less than 0.20 and preferably not less than 0.25. The intensity of the backscattered light is, in particular, 0.25 or more and especially preferably at least 0.30. Especially preferred are systems exhibiting a backscattering of more than 0.34 and in particular between 0.34 and 0.38.

The intensity of backscattered light can easily be measured using a suitably configured integrating sphere. Backscatter is the ratio of total light intensity entering the sphere, to the backscattered intensity recorded from a photodetector placed at the exit port of the sphere.

The properties of the paper white PDLC systems according to the present invention, are best described by the hiding power of the PDLC film in the off state which should be high enough to avoid shining through of the black or colored backplane arranged on the rear side of the system. The hiding power can be assessed by visual inspection of the system; in case the system appears to the grayish and slightly colored in the off-state and/or if it is not possible to eliminate the grayish or slightly colored visual impression by a proper choice of the color of the surrounding frame which usually encompasses the PDLC film and the backplane the hiding power of the system is not sufficient.

The hiding power of the paper white PDLC systems according to the invention can simply be measured by using a sloping surface with numbered markers; the opacity or hiding power of the PDLC film is determined by noting how near the closest marker that can be seen is to the film. Commercially available goniospectropotometers can also be used.

In J. Appl. Phys., 69 (1991) Montgomery et al. gave the following general formula (1) for the ratio of backscattering B from PDLC films which is based on the Rayleigh-Gans scattering theory for a single droplet $$B = \frac{3\pi n_M d}{2} |m-1|2\frac{\eta}{\lambda} \frac{\phi_b (ka)}{ka} \quad (1)$$

wherein $n_M$ is the refractive index of the polymer, m is $n_M/\bar{n}$ $\bar{n}$ is the average refractive index of the liquid crystal ($\bar{n}^2=\frac{1}{3}(n_e^2+2n_o^2)$) with $n_e$ and $n_o$ denoting the extraordinary resp. the ordinary index of refraction of the liquid crystal), d is the thickness of the PDLC film, η is the volume fraction occupied by the droplet in the PDLC film, λ is the wavelength of light, a is the droplet radius $\phi_b$ (ka) is a function of the droplet scattering cross section and k is the wave number $2\pi n_p/\lambda$.

One can take from this equation that the ratio of backscattering increases with increasing mismatch between $\bar{n}$ and $n_M$. Starting from this equation it was found by the present inventors that PDLC films with improved properties are obtained if $$|\bar{n}-n_M| \geq 0.05$$

and, in particular $$|\bar{n}-n_M| \geq 0.07$$

It was further found that electrooptical systems with advantageous properties can be obtained if the birefringence of the liquid crystal mixture used, is chosen not to be too low.

The birefringence of the liquid crystal mixture preferably should not be less than $\Delta n \geq 0.15$ and, in particular, $\Delta n \geq 0.18$.

Especially preferred are electrooptical systems according to the present invention the liquid crystal mixture of which contains 15–85 wt. % and, in particular, 25–85 wt. % of one or more compounds of formula I wherein $Z^1$ and $Z^2$ are independently from each other a single bond, —CH$_2$CH$_2$—, —COO—, —OCO— or —C≡C—, n is 0, 1 or 2, in case n=0 and at least one of in case n=1 or 2 is 1,4-phenylene, 2-fluoro-1,4-phenylene, 3-fluoro-1,4-phenylene, 2,3-difluoro-1,4-phenylene or 3,5-difluoro-1,4-phenylene, whereby the other groups in case n=1 or 2 optionally also denote trans-1,4-cyclohexylene, pyrimidine-2,5-diyl, pyridine-2,5-diyl or trans-1,3-dioxane-2,5-diyl, $X^1$ and $X^2$ are, independently from each other, H or F, Q is CF$_2$, OCF$_2$, C$_2$F$_4$, OC$_2$F$_4$ or a single bond, Y is H, F, Cl or CN, and R is alkyl having up to 13 C atoms in which one, two or three non-adjacent CH$_2$ groups can also be replaced by —O— and/or —CH=CH—.

The proportion of the compounds of the formula I in the liquid crystal mixtures used according to the invention is preferably not too small and is in particular more than 15% and very particularly more than 20%. Liquid crystal mixtures containing more than 40% and in particular not less than 50% of compounds of the formula I are particularly preferred.

The liquid crystal mixtures used according to the invention can contain further components which are preferably selected from nematic or nematogenic (monotropic or isotropic) substances, in particular substances from the group comprising azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexylphenyl cyclohexanecarboxylate, cyclohexylphenyl cyclohexylcyclohexanecarboxylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis(cyclohexyl)benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compound can also be fluorinated.

The liquid crystal mixtures used in the electrooptical systems according to the invention preferably also contain one or more dielectrically neutral compounds of the formulae 1–5:

R"-L-E-R'"      1

R"-L-CH$_2$CH$_2$-E-R"      2

In the formulae 1 and 2 L and E, which may be identical or different, are each, independently of one another, a bivalent radical from the group comprising -Phe-, -Cyc-, -Phe-Phe-, -Phe-Cyc-, -Cyc-Cyc-, -Pyr-, -Dio-, -G-Phe- and- G-Cyc- and mirror images thereof, Phe being unsubstituted or fluorine substituted 1,4-phenylene, Cyc being trans-1,4-cyclohexylene or 1,4-cyclohexenylene, Pyr being pyrimidine-2,5-diyl or pyridine-2,5-diyl, Dio being 1,3-dioxane-2, 5-diyl and G being 2-(trans-1,4-cyclohexyl)ethyl, pyrimidine-2,5-diyl, pyridine-2,5-diyl or 1,3-dioxane-2,5-diyl.

One of the radical L and E is preferably Cyc, Phe or Pyr. E is preferably Cyc, Phe or Phe-Cyc. The liquid crystals according to the invention preferably contain one or more components selected from compounds of the formulae 1 and 2, in which L and E are selected from the group comprising Cyc, Phe and Pyr and simultaneously one or more components are selected from the compounds of the formulae 1 and 2, in which one of the radicals L and E is selected from the group comprising Cyc, Phe and Pyr and the other radical is selected from the group comprising-Phe-Phe-, -Phe-Cyc-, -Cyc-Cyc-,-G-Phe- and-G-Cyc-, and, if desired, one or more components are selected from the compounds of the formulae 1 and 2, in which the radicals L and E are selected from the group comprising -Phe-Cyc-, -Cyc-Cyc-, -G-Phe- and- G-Cyc-.

R'" and R" in the compounds of the formulae 1 and 2 are each, independently of one another, preferably alkyl, alkenyl, alkoxy, aklenyloxy or alkanoyloxy having up to 8 carbon atoms. In most of these compounds, R'" and R" are different from one another, one of these radicals being in particular alkyl, alkoxy or alkenyl.

Especially preferred is the following smaller group of dielectrically neutral compounds of formulae 3 and 4 wherein
the meaning of R" and R'"is the same as given for formulae 1 and 2,

Z is independently from each other a single bond or —CH$_2$CH$_2$—, l and m are independently from each other 0 or 1, and denotes 1,4-phenylene, 2-fluoro-1,4-phenyl or 3-fluoro- 1,4-phenylene.

The weight proportion of the compounds of the formulae 1–4 in the liquid crystals used according to the invention is preferably 0–50% and in particular 0–40%.

One skilled in the art can select additives for the liquid crystal mixtures described from the large pool of nematic or nematogenic substances in such a manner that the birefringence An and/or the ordinary refractive index $n_o$ and/or other refractive indices and/or the viscosity and/or the dielectric anisotropy and/or further parameters of the liquid crystal are optimized with respect to the particular application.

The liquid crystal mixture can contain further additives such as, for example, chiral compounds and other customary additives. The concentration of such additives is preferably not more than 7.5% and, in particular lower than 5%.

The precursor of the polymer is preferably chosen in such a way that the absolute value of the difference between the refractive index of the cured polymer $n_M$ and the refractive index of the liquid crystal mixture which is to be adjusted, i.e. usually $n_o$ (cf above), does not exceed 0.05, specifically $$|n_M - n_o| \leq 0.05$$

In particular, this mismatch is less than 0.025 and especially preferably not more than 0.01 and, in particular, less than 0.008.

The precursor of the polymer is preferably based on an ene-type component comprising one or more olefinically unsaturated monomers and/or oligomers.

Preferred is the following smaller group of olefinically unsaturated monomers which is to illustrate the invention without restricting it:

vinyl chloride, vinylidene chloride, acrylonitrile, methacrylonitrile, acrylamide, methacrylamide, methylacrylate or methacrylate, ethylacrylate or methacrylate, n- or tert-butylacrylate or methacrylate, cyclohexylacrylate or methacrylate, 2-ethylhexylacrylate or methacrylate, benzylacrylate or methacrylate, phenyloxyethylacrylate or methacrylate, hydroxyethylacrylate or methacrylate, hydroxypropylaerylate or methacrylate, lower alkoxyethylacrylate or methacrylate, tetrahyderofurfuryl acrylate or methacrylate, vinyl acetate, vinyl propionate, vinyl acrylate, vinyl succinate, N-vinylpyrrolidone, N-vinylcarbazole, styrene, divinylbenzene, ethylene diacrylate, 1,6-hexandiol diacrylate, bisphenol A diacrylate and dimethacrylate, trimethylolpropane diacrylate, pentaerythritol triacrylate, triethylene glycol diacrylate,ethylene glycol dimethaerylate, tripropylene glycol triacrylate, pentaerythritol tetraacrylate, ditrimethylpropane tetraacrylate and dipentaerythritol pentaacrylate or hexaacrylate.

Especially preferred are acrylate type compounds.

Examples for olefinically unsaturated oligomers are the commercially available oligomers Ebecryl 270 (aliphatical urethane/diacrylate), Ebeeryl 1810 (polyester/tetraacrylate) and/or Ebecryl 600 (bisphenol-A-epoxy/diacrylate). Other oligomers can be used, and the examples given are to illustrate the invention without limiting it.

The mass ratio of the ene-type component with respect to the mass of the precursor of the polymer matrix preferably amounts to 5–95% and, in particular, to 15–90%.

The precursor of the polymer matrix can contain polymerizable monomers and/or oligomers other than ene-type compounds like, for example, compounds with two or more hydroxyl groups, two or more isocyanate groups, a hydroxyl group and/or isocyanate group and other polymerizable groups or other compounds in order to influence and optimize the properties of the precursor and the cured polymer matrix.

Especially preferred as further components of the precursor of the polymer matrix are di- or higher functional thiol monomers and/or oligomers (=compounds with at least two SH-groups). Preferred examples of thiol monomers can be taken from the following list:

2,2'-dimercaptodiethyl ether, glycol dimercaptoacetate, glycol dimercaptopropionate (also termed ethylene bis(3-mercaptopropionate)), pentaerythritol tetra (3-mercaptopropionate), pentaerythritol tetrathioglycolate, trimethylolethane tri(3-mercaptopropionate), trimethylolethane trithioglycolate, trimethylolpropane tri(3-mercaptopropionate), trimethylolpropane trithioglycolate, dipentaerythritol hexa(3-mercaptopropionate), polyethylene glycol dimercaptoacetate, and polyethylene glycol di(3-mercaptopropionate).

Precursors of the polymer matrix containing one or more thiol monomers and/or oligomers are preferred because the formation of the correct Swiss cheese morphology is distinctly such by adding a thiol component.

The mass ratio of the thiol component preferably is not too high, especially not more than 50% and, in particular, less than 25% with respect to the mass of the precursor of the matrix. If the amount of the thiol component is chosen too high this often adversely affects the solubility of the liquid crystal mixture in the precursor.

The precursor of the polymer matrix can contain other components such as, for example, softening agents, stabilizing agents or other additives customary in the field of polymers. In case the PDLC film is obtained via photoradical PIPS, the additives must be carefully chosen as to survive the free radical curing conditions. Brightening agents such as POPOP or fluorescent dyes which can be used to make the white of the PDLC film even whiter can therefore be used only when non-radical PIPS is applied as, for example, in the case of heat cured epoxy systems, SIPS, TIPS or other non-radical curing methods—and even in these cases not quite generally because of the thermal instability of such brightening agents. The percentage of such and further additives is, however, preferably small and does in particular, not exceed 7.5% and is especially less than 5%. Additives often tend to lower the specific resistance of the cured matrix thus decreasing the holding ratio. The photoradical PIPS technique is quite generally preferred so that the addition of brightening agents and/or dyes often is only of marginal importance.

Both the composition of the liquid crystal mixture and of the precursor of the polymer matrix can be varied in order to fulfill the condition.

$$|n-n_M| \geq 0.05$$

When selecting the liquid crystal compounds at least partly from the pool of compounds according to formula I and using the preferred precursors of the polymer matrix described above in some detail, the expert will be able to fulfil this condition easily without any inventive effort; in few cases, some routine experiments might have to be done but the necessary experimental effort is limited.

The present invention is, however, not restricted to liquid crystal mixtures containing at least one compound of formula I and/or to the preferred precursor of the polymer matrix described above, but the technical teaching of the present invention is quite generally valid and can be realized also with other liquid crystal mixtures and/or precursors.

The Montgomery formula (1) further suggests that backscattering can be increased by increasing the thickness d of the PDLC film. The ratio of backscattered light is also influenced by the number and density of liquid crystal microdroplets which reflects itself in the ratio of the liquid crystal mixture with respect to the mass of the precursor of the polymer matrix. Considering these general guidelines the present inventors found out in extensive experimental investigations that the film thickness d preferably is between 5 μm≦d≦75 μm. Increasing the film thickness above the upper limit yields a high degree of backscattering but at the same time high to very high values of the switching and saturation voltage which are generally considered to be not acceptable. In case d≦5 μm the amount of backscattered light and the hiding power of the PDLC are generally found to be insufficient. A good compromise with respect to switching voltage and degree of backscattering is realized in PDLC films with 10 μm≦d≦60 μm, and electrooptical systems containing PDLC films with such a thickness are especially preferred.

The present inventors found out further that the ratio of the liquid crystal mixture with respect to the mass of the PDLC film preferably amounts between 30% and 95%. The upper limit is often difficult to realize because of the limited solubility of the liquid crystal mixture in the precursor of polymer matrix. It was, however, observed by the present inventors that a sufficient solubility of the liquid crystal mixture in the precursor of the polymer is quite generally obtained if the liquid crystal mixture contains at least 15% and, in particular, not less than 25% of one or more SFM compounds according to formula I wherein Q=CF$_2$, OCF$_2$, C$_2$F$_4$, OC$_2$F$_4$ or a single bond, if the liquid crystal mixture contains at least 30% of carbonitrile compounds and exhibits a complex composition of at least 6 and especially at least 7 liquid crystalline compounds, or if the liquid crystal mixture contains at least 15% of at least one 2-ring and at least one 3-ring carbonitrile compound according to formula I with the ratio of the percentages of 3- and 4-ring compounds to 2-ring compounds being at least 0.18.

In particular, the solubility of these preferred liquid crystal mixtures was found to be sufficiently good in precursors of the polymer containing one or more ene-type monomers and/or oligomers. The concentration of the liquid crystal mixture with respect to the mass of the PDLC film preferably is arranged between 40% and 85%.

Another important parameter which influences the degree of backscattering is the mean size of the microdroplets. It can be derived from the Montgomery formula (1) that the optimum droplet size for realizing a high degree of backscattering is about λ/5 for PDLC films with a high or relatively high liquid crystal concentration. The present inventors found out that fulfilling this condition implies high to very high operation voltages which are completely unacceptable from a practical point of view. It was found in extensive investigations that adjusting the mean droplet size between 0.25 and 2 µm and, in particular, 0.3 and 2 µm yields a good compromise between the conflicting demands for a high degree of backscattering and for low operation voltages. In case the liquid crystal mixture used exhibits a high solubility in the precursor of the polymer matrix of 45% or more with respect to the mass of the PDLC film, the mean droplet size is preferably chosen to be 2 µm or less because the operation voltages are decreasing with increasing liquid crystal ratio.

By varying the concentration of the liquid crystal mixture, its chemical composition, the concentration of the prepolymer, the curing conditions such as the UV-exposure intensity, the cell gap, the mean size of the microdroplets and also further parameters, the electrooptical properties of the paper white PDLC system according to the present invention can be varied and optimized with respect to the specific application.

In the following, this will be explained in some detail for two specific systems described in examples 6–7. Example 6 discussed under a) is an example for an active-matrix driven paper white PDLC systems while example 7 was designed as a wide temperature range systems to be used, for example, in statically or passively driven outdoor systems.

a) Combining a paper white PDLC display with an active-matrix driving scheme requires a low switching voltage $V_{90} < 15$ V, specifically of not more than 12 V in order to establish compatibility with commercially available analogue driver ICs. The holding ratio of the system has to be chosen to be 95% or more. A high contrast ratio of preferably not less than 8:1, specifically 10:1 or more is desired.

These requirements can be fulfilled by choosing a high concentration of the liquid crystal mixture of preferably at least 75%, especially, however, 80% or more with respect to the mass of the PDLC film. The contrast of the PDLC film increases with increasing concentration of the precursor of the polymer but at the same time a distinct increase of $V_{90}$ is observed. The concentration of the precursor of the polymer with respect to the mass of an actively driven PDLC film was often found to be optimally chosen to be less than 25% and, in particular, to be within 17.5–22.5%.

The liquid crystal mixture of an actively driven PDLC-film is preferably based on SFM-compounds; the percentage of carbonitrile compounds with respect to the mass of the liquid crystal mixture preferably is not more than 10% and very specifically, no carbonitrile compounds are employed.

With increasing UV-exposure intensity, both contrast and switching voltage are generally observed to increase; good results are often obtained for UV-exposure intensities between 5–100 mW/cm$^2$.

Figure 3:
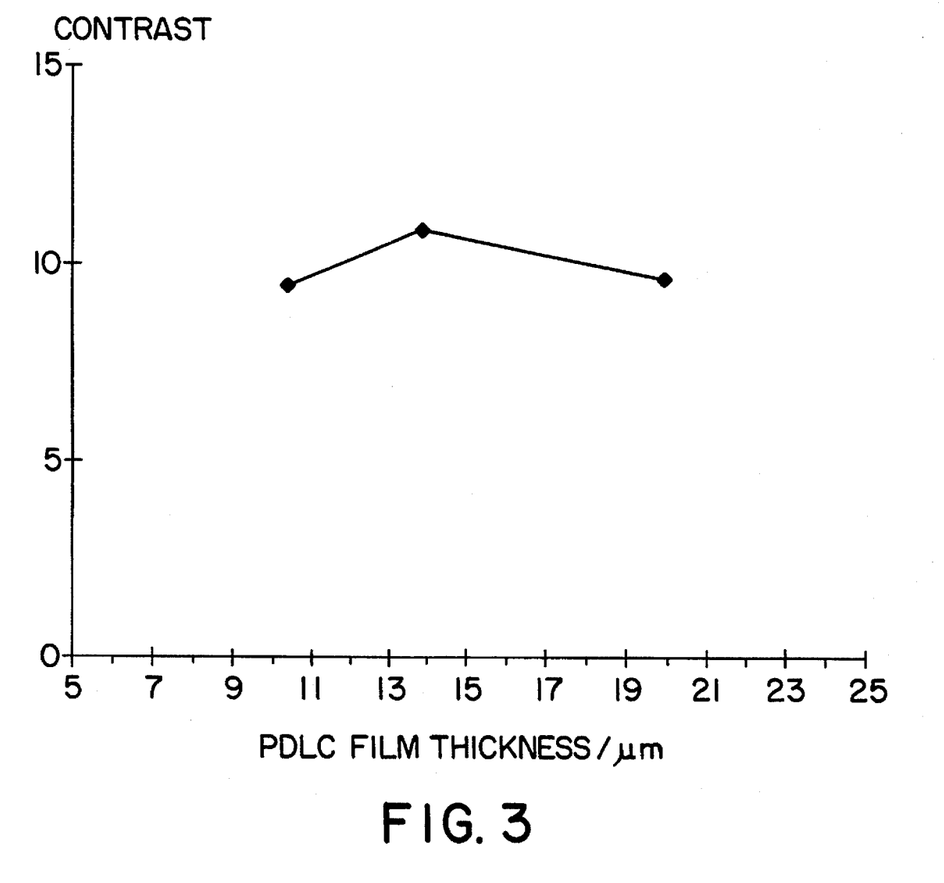

The contrast is also a function of the thickness of the PDLC film which is shown in FIG. 3 for the system described in example 6. In case of example 6, the PDLC film thickness was adjusted to be 14 µm.

b) A paper-white PDLC system designed for outdoor applications must be capable of operating from −20° to 70° C. at a reasonable voltage; systems of this type are often driven statically or via a passive matrix and they are used in most cases in direct view devices.

In order to achieve good contrast over this temperature range, the PDLC film must be capable of exhibiting at least 78% transmission (relative to air) in the ON state in the whole temperature range so that the backplane (if present) can be clearly seen.

These requirements can often be met by using a liquid crystal concentration of 35–75%, in particular 45–70% with respect to the mass of the PDLC film.

Due to the lower liquid crystal concentration, the precursor of the PDLC film can be used on flexible substrates while in the case of active-matrix driven systems with a high liquid crystal concentration (see a)) rigid substrates are often required.

Since the static or passive multiplex driving scheme is usually employed the requirements with respect to the holding ratio are less stringent and the liquid crystal mixture preferably contains 20% or more, specifically not less then 40% of carbonitrile compounds.

The thickness of the PDLC film is preferably chosen to be between 10 and 40 µm and, in particular, between 15 and 30 µm. It is true that the degree of backscatter increases with increasing thickness of the PDLC film but the operating voltage drastically increases at the same time so that a medium value of the film thickness is preferred as indicated.

Figure 4:
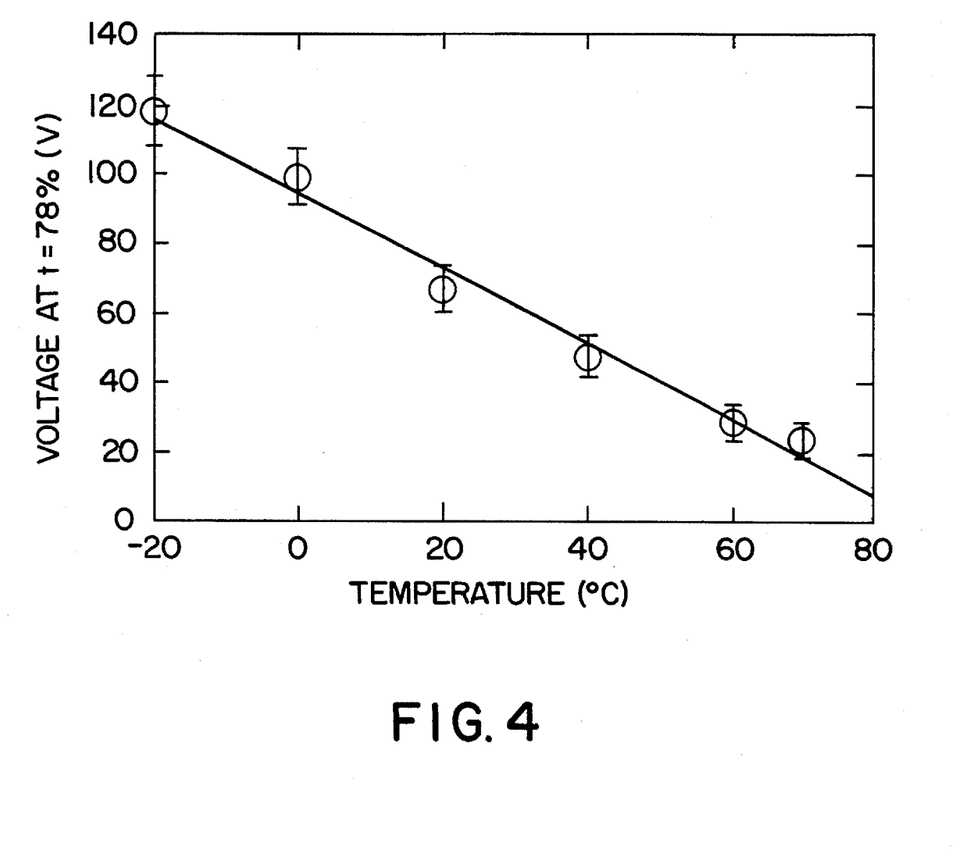

FIG. 4 shows the operating voltage (=voltage required to exhibit 78% ON state transmission) for the liquid crystal system described in example 7. When the film is driven at 120 V, the transmission may be greater than 78%, especially at temperatures higher than −20° C.; consequently, contrast and viewing angle will also be improved.

The concrete examples described are to illustrate that the electrooptical properties of the paper white PDLC systems according to the present invention can be modified within wide limits so as to properly respond to different requirements and to be properly adapted for different applications. On the basis of the present specification, the expert can easily find other modifications and adaptations for specific applications, and the examples given are by no means intended to limit the scope of the invention.

The preparation of the PDLC films according to the invention corresponds to the customary made of preparation for systems of this type.

The precursor of the polymer matrix, the liquid crystal mixture and further additives if any are mixed; the different components are termed to be soluble in each other if a mixture of them forms a clear solution at room temperature or at elevated temperatures.

Curing preferably proceeds via conventional techniques such as PIPS, SIPS, TIPS or other techniques.

In the case of photoradical PIPS technology, which is preferred, a photoinitiator is added to the mixture resp. to the clear solution. Photoinitiators forming radicals are preferred; examples of suitable photoinitiators are given, for example, in DE 41 04 183. The mass ratio of the photoinitiators, related to the mass of the precursor of the PDLC film, preferably is 0.1–5% and especially 0.5–3%.

The droplet size is preferably controlled by the amount of initiator used, power of lamp and the detailed composition of the precursor of the matrix. Methods for controlling the droplet size are described in literature like, for example, in U.S. Pat. No. 4,673,255 and J. L. West, Mol. Cryst. Liq. Cryst. Inc. Nord. Opt., 157 (1988), 427 but also other methods can be used. The expert can choose appropriate reaction conditions in order to adjust the desired mean droplet diameter, without any inventive effort.

The present inventors further found out that optimizing the different parameters of a PDLC film mentioned with respect to a high degree of backscattering often does not yield a paper white PDLC system which stands a visual inspection and satisfies from an aesthetical point of view.

Therefore a colored or black backplane is preferably attached to the paper white PDLC system in order to increase contrast. It is, however, often observed that the backplane shines through which results in a grayish or slightly colored appearance of the scattering state.

The present inventors found out that this decisive drawback can be overcome or at least drastically diminished if the colored backplane is optically decoupled from the PDLC device.

This is achieved by separating the rear side of the PDLC device (i.e. normally the substrate made from glass or another transparent material) from the backplane by a small gap of air or another gaseous medium. Alternatively, a low refractive index adhesive can be used to decouple backplane and PDLC device optically.

The gap is preferably smaller than 1 mm and in particular not more than 100 µm since otherwise too much parallax will be seen. Especially preferred is a gap width of less than 10 µm and even submicron gaps are possible and preferred.

The construction of the electrooptical system according to the present invention orientates itself by the mode of construction customary for PDLC devices.

Thus, for example, the matrix formed by the transparent medium in which the liquid crystal mixture is microdispersed or microencapsulated is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided. The elctrooptical systems according to the present invention can be driven statically or they can be multiplexed both actively and passively; in each case, the electrode layers have to be designed appropriately as is described, for example, in some detail in E. Kaneko, Liquid Crystal Display, UTK Scientific Publishers.

The PDLC device can contain further layers such as, for example, compensation layers, antireflection layers on the top or the substrate or other layers. The construction described is restricted to the most essential elements of the PDLC device but is by no means thought to be complete.

In a preferred embodiment, according to the present invention, the paper white PDLC system exhibits on its rear opposite to the viewer's side, a backplane which might be black or colored. The backplane is being separated by a small gap filled with air or another gaseous medium, in particular, however, air from the rear side of the PDLC system. In case a substrate forms the rear side of the PDLC device, this may exhibit a small hollow of the desired dimensions on top of the substrate being surrounded by a small edge onto which the backplane is applied. It is of course also possible to use small transparent spacers which are preferably made from the material of the substrate. The diameter of the spacers corresponds to the desired gap width, and the backplane is laid onto them and fixed with the substrate via a sealing, for example. The gap between backplane and substrate can further be produced by using a rough substrate surface; this technique can provide submicron gaps. Alternatively, a low refractive index adhesive can be used to attach the backplane to the PDLC device.

These technical solutions described are thought to be only illustrative and by no means limiting. The expert can easily find other and/or modified techniques without any inventive effort. The backplane can be made from conventional materials such as printer paper sheets or other materials.

The experiments reported below are thought to be illustrative but by no means limiting.

EXAMPLE 1

A PDLC film is obtained by curing a mixture of the precursor of the polymer, consisting of 9.9% of TMPTMP 45.0% of EHA 12.0% of HDDA 30.6% of E 270

2.5% of D 1173 (photoinitiator), and the liquid crystal mixture BLO 13 (available through Merck Ltd., Poole, UK) in a 1:3 mass ratio.

The abbreviations used have the following meaning:

TMPTMP=trimethylolpropanetri (3-mercaptopropionate)

EHA=2-ethyl-hexanolacrylate

E270=commercially available oligomer Ebecryl 270 (aliphatic urethane diacrylate, molecular weight≈1.200 g/mol)

HDDA=hexanediol diacrylate

D1173=Darocur® 1173 (available through E. Merck, Darmstadt, Germany)

The mixture of the precursor of the polymer and BL 013 is filled between two glass plates each of them exhibiting an electrode layer, and cured with a medium pressure Xenon lamp (Heraeus Suntest, 3 mW/cm$^2$) for 20 min. The film thickness defined by spacers is 50 µm. SEM inspection shows that most droples are between 0.4 and 0.7 µm in diameter with a few larger ones. The difference $|\bar{n}-n_M|$ amounts to about 0.1. The mean refractive index $\bar{n}$ of the liquid crystal mixture BLO 13 amounts to $\bar{n}=1.6235$, and the refractive index of the pure polymer (no liquid crystal incorporated) is $n_p=1.486$. This value increases, however, to a value of about $n_M=1.52$ because of some liquid crystal mixture being dissolved in the matrix.

Figure 1:
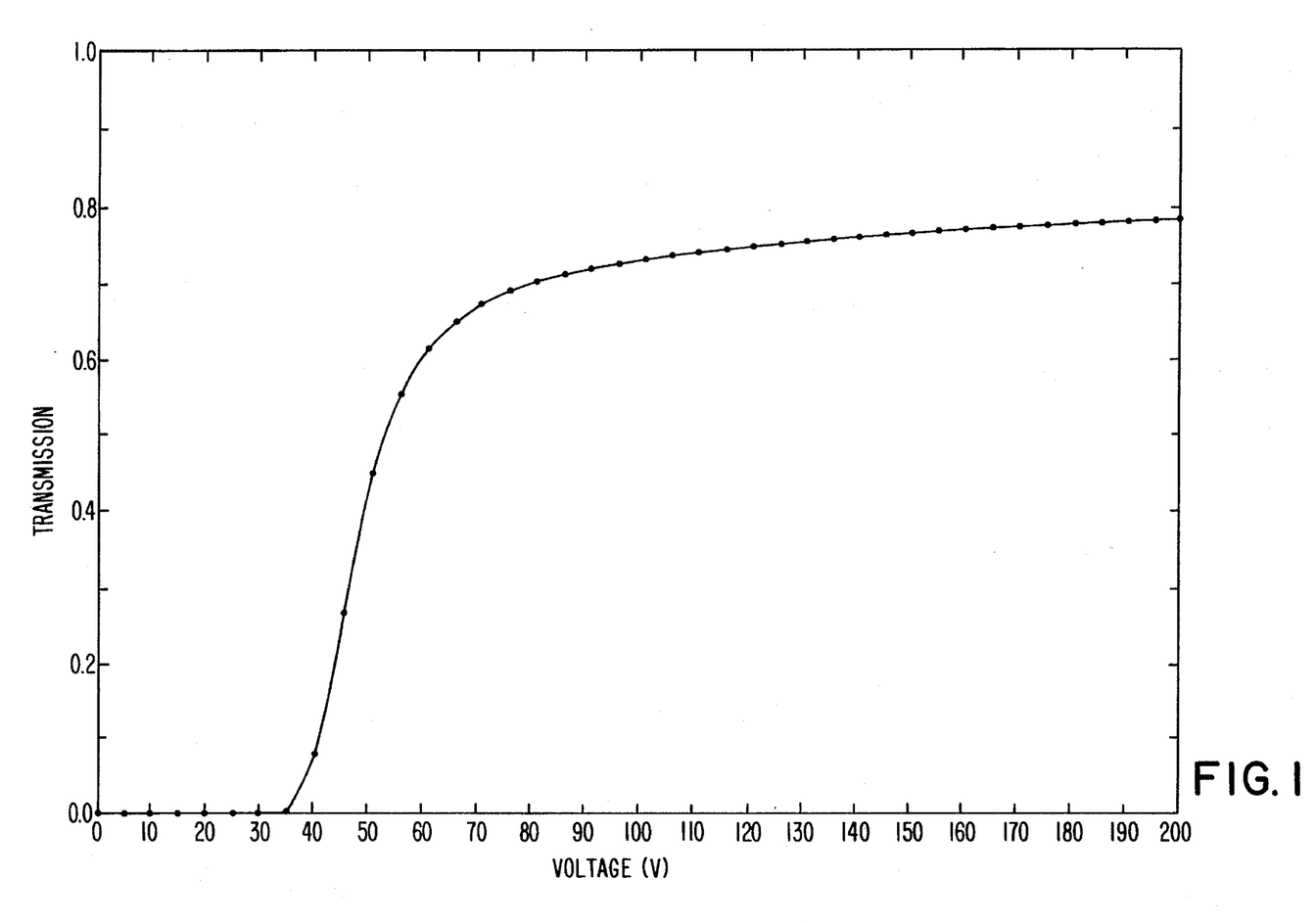

The PDLC system obtained (no backplane applied) is irradiated with a white light source (halogen bulb, modified with an eye response filter). The transmission is measured with a photometer (silicon photodiode) under a collection angle of 2°. As can be seen from FIG. 1 the PDLC system exhibits a very low transmission of about 0.79. Backscattering measured as described above was found to be 30%.

Then a black backplane is attached to the rear substrate by clamps; the gap width is about 100 µm. The electrooptical system obtained exhibits an excellent hiding power in the off-state; the backplane cannot be seen until the system is switched on, then the backplane is very clearly seen. In the off-state the film appears white.

EXAMPLE 2

The procedure of example 1 is repeated by using a mixture of BL036 (liquid crystal mixture available through Merck Ltd., Poole, UK) and the precursor of the polymer described in example 1, in a mass ratio of 3:2. The film thickness amounts to 50 µm.

The PDLC system (no backplane applied) exhibits the following properties:

| | |
|---|---|
| threshold voltage: | 52.0 V |
| saturation voltage: | 112.5 V |
| minimum transmission: | 0.001 |
| maximum transmission: | 0.744 |
| degree of backscatter: | 30% |
| droplet size: | mainly 0.4–0.7 µm |

Then a black backplane is attached to the rear substrate by clamps; the gap width is about 100 µm. The electrooptical system obtained exhibits an excellent hiding power in the off-state; the backplane cannot be seen until the system is switched on, then the backplane is very clearly seen. In the off-state the film appears white.

EXAMPLE 3

The procedure of example 1 is repeated by using a mixture of BLO36 and a precursor of the polymer system consisting of 80% of NOA 65
19.5% of EHA
0.5% of D 1173 in a mass ratio of 3:2; NOA 65 is commercially available through Norland Products. The thickness of the PDLC film amounts to 50 µm.

The PDLC system (no backplane applied) exhibits the following properties:

| threshold voltage: | 55.7 V |
| --- | --- |
| saturation voltage: | 114.9 V |
| minimum transmission: | 0.0 |
| maximum transmission: | 0.669 |
| droplet size: | mainly 0.4–0.7 µm |

Then a black backplane is attached to the rear substrate by clamps; the gap width is about 100 µm. The electrooptical system obtained exhibits an excellent hiding power in the off-state; the backplane cannot be seen until the system is switched on, then the backplane is very clearly seen. In the off-state the film appears white.

EXAMPLE 4

The procedure of example 1 is repeated by using a mixture of BLO13 and NOA 65 (precursor of the polymer matrix commercially available through Nodand Products) in a mass ratio of 7:3. The thickness of the PDLC film amounts to 50 µm; SEM inspection shows that most droplets are between 0.4 and 0.7 µm in diameter with a few larger ones. The PDLC film (no backplane applied) exhibits a degree of backscattering of 34% which is very close to the backscattering maximum achievable of about 38% (according to theoretical considerations based on the Montgomery formula (1) given above).

Then a black backplane is attached to the rear substrate by clamps; the gap width is about 100 µm. The electrooptical system obtained exhibits an excellent hiding power in the off-state; the backplane cannot be seen until the system is switched on, then the backplane is very clearly seen. In the off-state the film appears white.

EXAMPLE 5

The procedure of example 1 is repeated by using a mixture BLO12 and the precursor of the polymer described in example 1 in a mass ratio of 75:25. The thickness of the PDLC film is adjusted to 25 µm and to 50 µm. The measurements were performed at 20° C.

Figure 2:
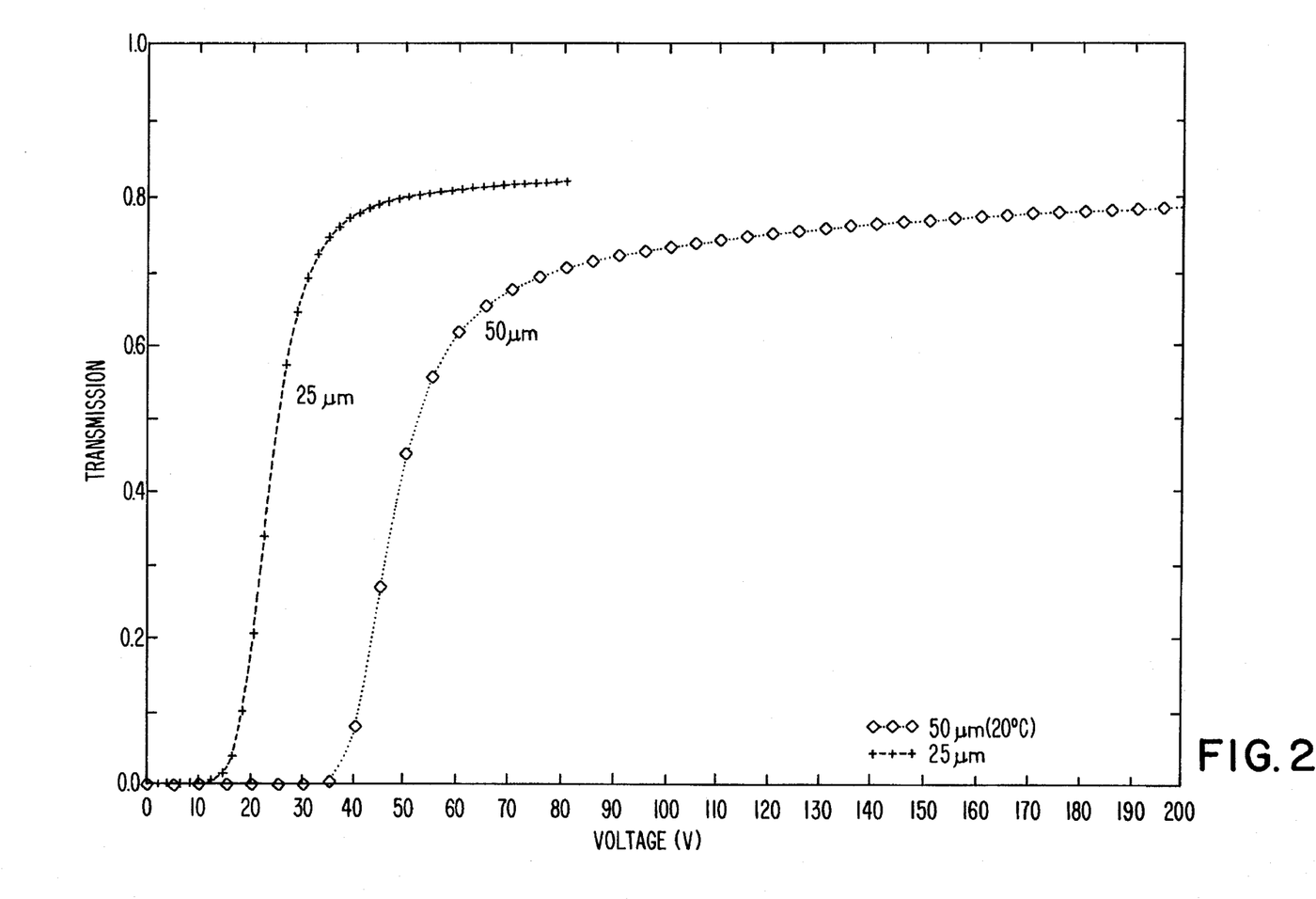

The electrooptical properties of the PDLC film (no backplane applied) can be seen from FIG. 2 (left curve for d=25 µm, right curve for d=50 µm); in particular, one obtains the following properties:

|  | 25 µm | 50 µm |
| --- | --- | --- |
| threshold voltage/V | 17.3 | 40 |
| saturation voltage/V | 33.5 | 82 |
| minimum transmission | 0.004 | 0.0 |
| maximum transmission | 0.806 | 0.7 |
| droplet size: | mainly 0.4–0.7 µm (in both cases) | |

Then a black backplane is attached to the rear substrate of each PDLC film by clamps; the gap width is in each case about 100 µm. The 50 µm PDLC film exhibits a greater hiding power and appears to be whiter than the 25 µm film but the operation voltages are at the same time distinctly higher. Both systems exhibit a good hiding power and a high degree of backscattering and appear to be white in the off-state.

EXAMPLE 6

A PDLC film is obtained by curing a mixture of the precursor of the polymer, consisting of 87% of EHA
2% of TMPTA
10% of E 1810
1% of D 4265 (photoinitiator)

and the liquid crystal mixture TL 205 (available through Merck Ltd., Poole, UK) in a 20:80 mass ratio.

The meaning of the abbreviation EMA is indicated above, the other abbreviations have the following meaning:

TMPTA=trimethylol propane triacrylate
E1810=commercially available oligomer Ebecryl 1810
D4265=Darocur®4265

The liquid crystal mixture TL 205 consists of
15.7% of 1-[4-(4-ethyl-2-fluoro-phenyl)-phenyl]-2-(4-chloro-phenyl)-ethane
8.1% of 1-[4-(4-propyl-2-fluoro-phenyl)-phenyl]-2-(4-chloro-phenyl)-ethane
21.2% of 1-[4-(4-pentyl-2-fluoro-phenyl)-phenyl]-2-(4-chloro-phenyl)-ethane
12.5% of 4-[4-(4-propylphenyl)-3-fluoro-phenyl]-3-fluoro-1-chlorobenzene
13.8% of 4-[4-(4-pentylphenyl)-3-fluoro-phenyl]-3-fluoro-1-chlorobenzene
8.7% of 4-[4-(4-propylphenyl)-3-fluoro-phenyl]-3-fluoro-1-fluorobenzene
10.0% of 4-(trans-4-propyl-cyclohexyl)-3,4'-difluorobiphenyl
10.0% of 4-(trans-4-pentyl-cyclohexyl)-3,4'-difluorobiphenyl and exhibits the following properties:
$\Delta\epsilon$ (1 kHz, 20° C.): 5.01
$\epsilon_{\parallel}$ (1 kHz, 20° C.): 9.11
$\Delta n$ (589 µm, 20° C.): 0.217
$n_o$(589 nm, 20° C.): 1.527
S-N [°C.]: –6° C.
clearing point: +92° C.
viscosity (20° C.): 45 cSt The mixture of the precursor of the polymer and TL 205 is filled between the glass plates of MIM addressed displays with 122 88 resp. 138 240 pels which are described in M. Dobler et al., SID 91 Digest, p. 427 resp. V Hochholzer et al., SID 90 Digest, p. 526. The curing was performed at an UV-exposure intensity of 34 mW/cm$^2$. The thickness of the PDLC film was 14 µm.

Then a black backplane is attached to the rear substrate by clamps the gap width is about 100 µm; alternatively, a low refractive index adhesive can be used. The electrooptical system obtained exhibits an excellent hiding power in the off-state; the backplane cannot be seen until the system is switched on, then the backplane is very clearly seen. In the off-state the film appears white.

Figure 5:
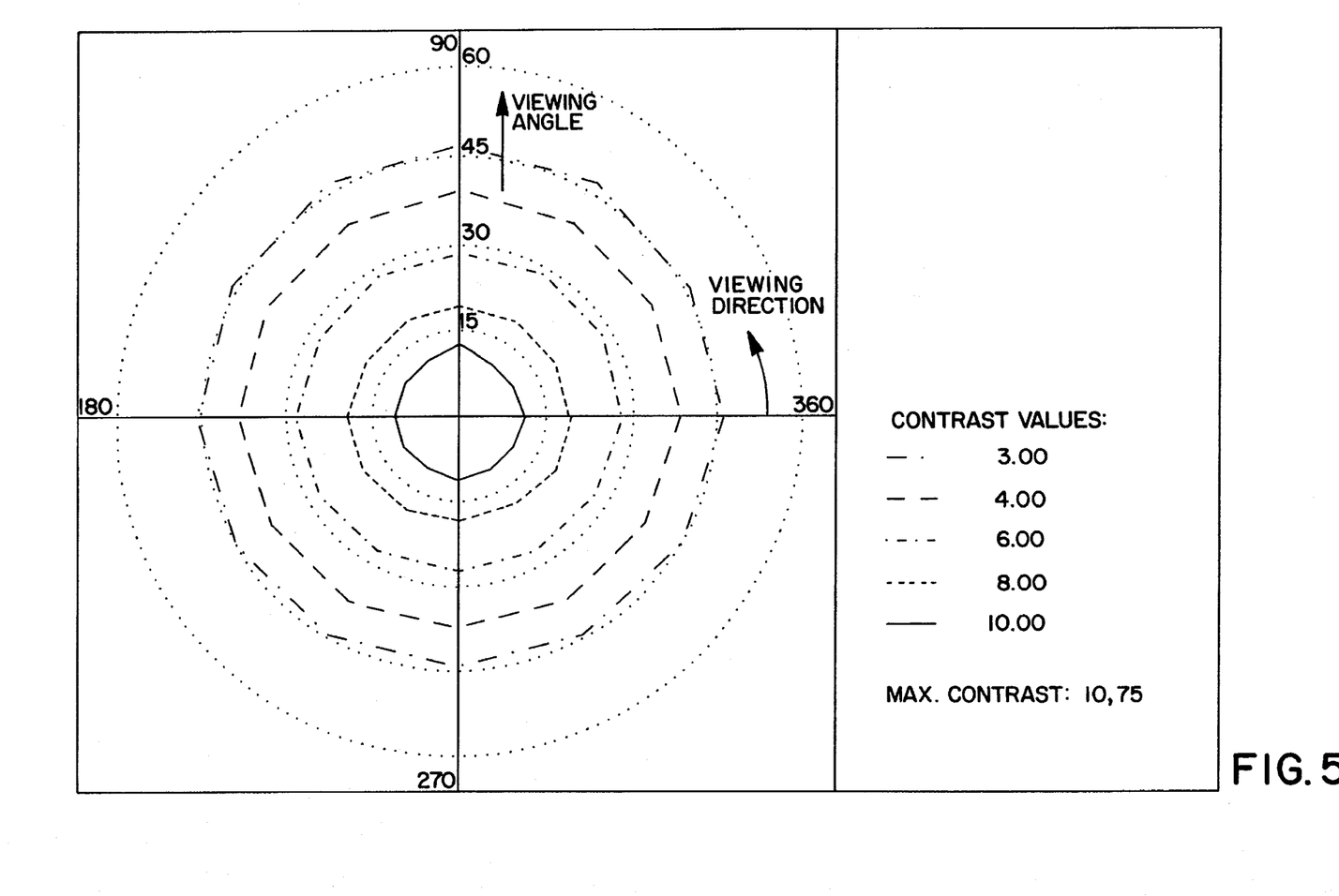

Under direct view conditions, the systems shows a reflective contrast ratio of 10.8:1 at normal incidence when measuring the ON and OFF state transmission at a collection angle of 0.5° (measuring area on the display: 250 μm); the ON state transmission was measured at a voltage of 12 V. One takes from the isocontrast plot of FIG. 5 that the system exhibits a wide symmetrical viewing angle (the half maximum contrast ratio occurs at about 32°).

EXAMPLE 7

A PDLC film is obtained by curing a mixture of the precursor of the polymer consisting of 38.0% of E 1810

33.0% of EHA 10.0% of TMPTA 18.0% TMPTMP 1.0% of I651 (photoinitiator)

and the liquid crystal mixture BLO 36 (available through Merck Ltd., Poole, UK) in a 40:60 mass ratio.

The meaning of the abbreviations E 1810, EHA, TMPTA and TMPTMP is given above, I 651 is Irgacure 651 (supplied by Ciba-Geigy).

The mixture of the precursor of the polymer and BLO 36 is filled between two glass plates each of them exhibiting an electrode layer, and cured with a UV-lamp (14 mW/cm$^2$ at the cell surface, emitted radiation centered around 350 nm) for 5 minutes; film thickness: 25 μm.

Then a black backplane is attached to the rear substrate by clamps, the gap width is about 100 μm; alternatively, a low refractive index adhesive can be used. The electrooptical system obtained exhibits an excellent hiding power in the off-state; the backplane cannot be seen until the system is switched on, then the backplane is very clearly seen. In the off-state the film appears white.

The performance of the film was measured at –20° C., 20° C. and 70° C. as is shown in the following table:

|  | –20° C. | +20° C. | +70° C. |
| --- | --- | --- | --- |
| $V_{90}$ (V) | 71.9 | 40.4 | 20.6 |
| $T_{ON}$ | 0.773 | 0.835 | 0.847 |
| $T_{OFF}$ | 0.010 | 0.001 | 0.001 |

It should be noted that the PDLC system shows no memory effects at high temperature.

Figure 6:
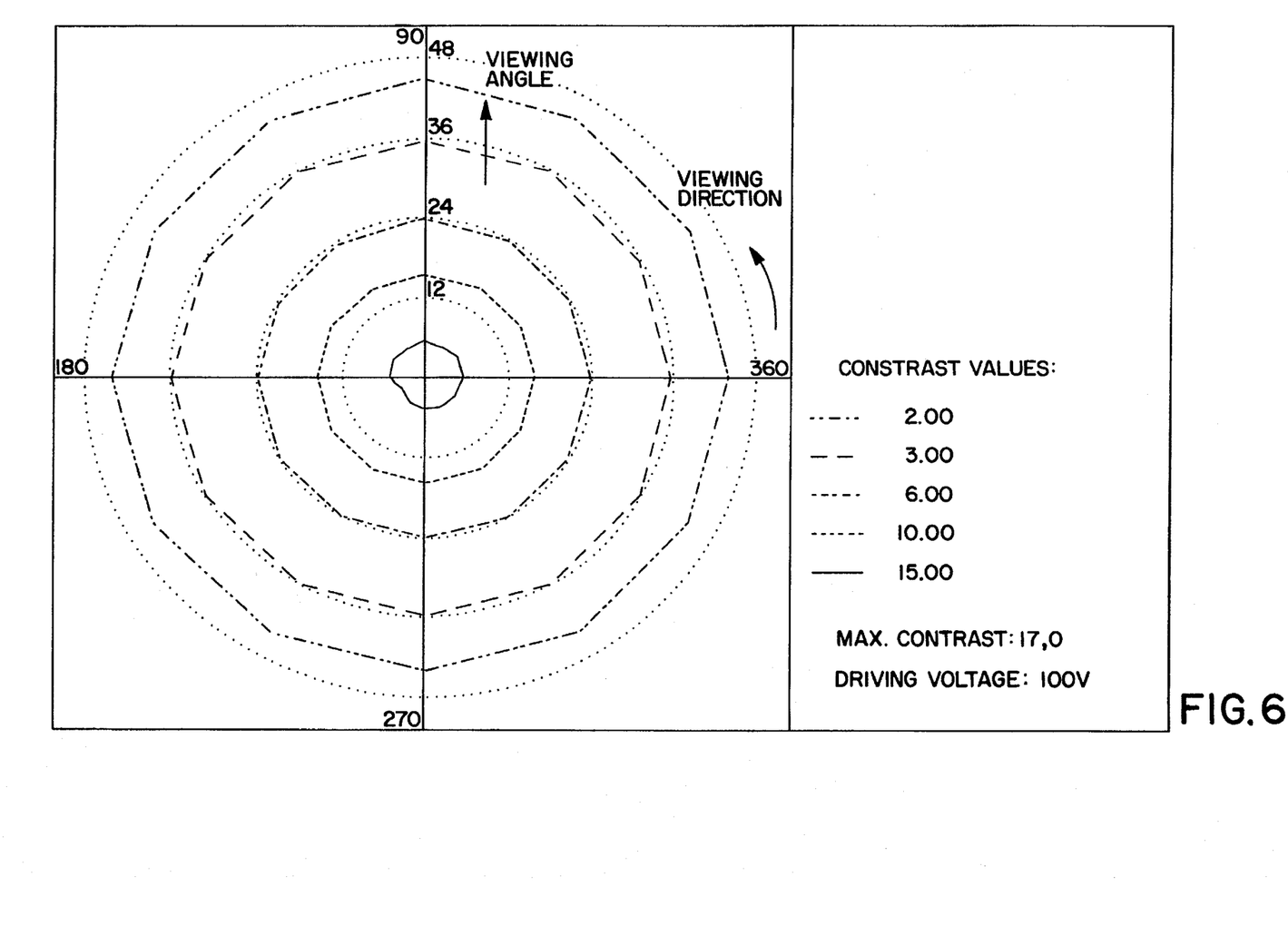

Under direct view conditions, the system shows a reflective contrast ratio of 17:1 at normal incidence when measuring the ON and OFF state transmission at a collection angle of 0.5° (measuring area on the display: 250 μm). The ON state transmission was measured at a voltage of 100 V; the contrast measurements were performed at room temperature. One takes from the isocontrast plot of FIG. 6 that the system exhibits a relatively wide and symmetrical viewing angle (the half maximum contrast ratio occurs at about 15°).

We claim:

1. A paper white PDLC system which between 2 electrodes contains a PDLC film comprising a liquid crystal mixture in the form of microdroplets in an optically isotropic, transparent polymer matrix, wherein:

one of the refractive indices of the liquid crystal mixture is matched to the refractive index of the polymer matrix, $n_M$;

neither the liquid crystal mixture nor transparent polymer matrix contains a dye;

the transmission of the PDLC film can be varied by applying an electrical voltage; and wherein the PDLC film exhibits the following properties:

$|\bar{n} - n_M| \geq 0.05$ wherein $\bar{n}$ is the mean refractive index of the liquid crystal mixture defined via $n^2 = \frac{1}{3}(n_e^2 + 2n_o^2)$ where $n_e$ is the extraordinary refractive index of the liquid crystal mixture and $n_o$ is the ordinary refractive index of the liquid crystal mixture;

a mean microdroplet diameter ≤ 2 μm;

a thickness, d, of the PDLC film of 5 μm ≤ d ≤ 75 μm; and a degree of backscatter ≥ 0.20%.

2. An electrooptical liquid crystal system containing a paper white PDLC system according to claim 1, wherein the system further contains a black or colored backplane which is optically decoupled from the PDLC film by a gap or by a low refractive index adhesive.

3. An electrooptical liquid crystal system according to claim 2, wherein the gap between the PDLC film and backplane is not more than 1 mm in order to reduce parallax.

4. An electrooptical liquid crystal system according to claim 3, wherein the gap is an air gap.

5. A computer screen or notepad screen based on a paper white PDLC system according to claim 1.

6. The paper white PDLC system of claim 1, wherein the PDLC film exhibits a degree of backscatter of from 0.34 to 0.38.

7. The paper white PDLC system of claim 1, wherein the PDLC film exhibits:

$|\bar{n} - n_M| \geq 0.07$.

8. The paper white PDLC system of claim 1, wherein the liquid crystal mixture has a birefringence, Δn, of ≥ 0.15.

9. The paper white PDLC system of claim 1, wherein the liquid crystal mixture contains 15–85 wt. % of one or more compounds of the formula I:

wherein $Z^1$ and $Z^2$ are independently from each other a single bond, —CH$_2$CH$_2$—, —COO—, —OCO— or —C≡C—, n is 0, 1 or 2, in case n=0 and at least one of in case n=1 or 2 is 1,4-phenylene, 2-fluoro-1,4-phenylene, 3-fluoro-1,4-phenylene, 2,3-difluoro-1,4-phenylene or 3,5- difluoro-1,4-phenylene, whereby the other groups in case n=1 or 2 optionally also denote trans-1,4-cyclohexylene, pyrimidine-2,5-diyl, pyridine-2,5-diyl or trans-1,3-dioxane-2,5-diyl, $X^1$ and $X^2$ are, independently from each other, H or F, Q is $CF_2$, $OCF_2$, $C_2F_4$, $OC_2F_4$ or a single bond, Y is H, F, Cl or CN, and R is alkyl having up to 13 C atoms in which one, two or three non-adjacent $CH_2$ groups can also be replaced by —O— and/or —CH=CH—.

10. The paper white PDLC system of claim 9, wherein the liquid crystal mixture contains at least 15% by weight of SFM compounds of the formula I wherein Q is $CF_2$, $OCF_2$, $C_2F_4$, $OC_2F_4$ or a single bond.

11. The paper white PDLC system of claim 9, wherein the liquid crystal mixture contains at least 15% by weight of 2-ring and 3-ring carbonitrile compounds of the formula I and the ratio by weight of 3- and 4-ring compounds to 2-ring compounds in the mixture is at least 0.18.

12. The paper white PDLC system of claim 1, wherein the PDLC film is prepared by polymerization-induced phase separation.

13. The paper white PDLC system of claim 1, wherein the PDLC film is prepared by photoradical polymerization-induced phase separation.

14. The paper white PDLC system of claim 1, wherein the PDLC film has a thickness, d, of 10 μm≧d≧60 μm.

15. The paper white PDLC system of claim 1, wherein the amount of the liquid crystal mixture in the PDLC film is from 30–95% by weight.

16. The paper white PDLC system of claim 1, wherein the liquid crystal mixture contains at least 30% by weight of carbonitrile compounds and contains at least 6 different liquid crystalline compound components.

17. The paper white PDLC system of claim 1, wherein the mean droplet diameter of microdroplets of the liquid crystal mixture in the polymer matrix is 0.25 to 2.0 μm.

* * * * *